United States Patent
Asahara

(10) Patent No.: US 9,852,365 B2
(45) Date of Patent: Dec. 26, 2017

(54) INFORMATION PROCESSING APPARATUS FOR IMPORTING SETTING INFORMATION IN A SYNCHRONOUS MANAGEMENT ENVIRONMENT, METHOD FOR CONTROLLING INFORMATION PROCESSING APPARATUS AND STORAGE MEDIUM ON WHICH COMPUTER READABLE PROGRAM IS STORED

(71) Applicant: CANON KABUSHIKI KAISHA, Tokyo (JP)

(72) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/167,851

(22) Filed: May 27, 2016

(65) Prior Publication Data
US 2016/0358047 A1  Dec. 8, 2016

(30) Foreign Application Priority Data

Jun. 3, 2015  (JP) ................. 2015-113010
Mar. 15, 2016  (JP) ................. 2016-050873

(51) Int. Cl.
| G06F 3/12 | (2006.01) |
| G06K 15/02 | (2006.01) |
| H04L 29/08 | (2006.01) |
| H04N 1/00 | (2006.01) |
| G06K 15/00 | (2006.01) |

(52) U.S. Cl.
CPC ...... *G06K 15/1805* (2013.01); *H04L 67/1095* (2013.01); *H04N 1/00344* (2013.01); *H04N 1/00411* (2013.01); *H04N 1/00509* (2013.01); *H04N 2201/0094* (2013.01)

(58) Field of Classification Search
CPC ............ G06K 15/1805; H04L 67/1095; H04N 1/00244; H04N 1/00344; H04N 1/00411; H04N 1/00509; H04N 1/4406; H04N 1/4413; H04N 2201/0039; H04N 2201/0094; H04N 2201/3204
USPC ................................ 358/1.1–1.18
See application file for complete search history.

(56) References Cited

U.S. PATENT DOCUMENTS

| 2005/0060649 A1* | 3/2005 | Kimura ................. G06F 3/1204 715/274 |
| 2007/0244930 A1* | 10/2007 | Bartlette ............ G06F 9/44505 |
| 2009/0237715 A1* | 9/2009 | Kasatani ............ H04L 63/0815 358/1.15 |
| 2011/0302637 A1* | 12/2011 | Hamada ................ G06F 3/1204 726/5 |
| 2012/0327442 A1* | 12/2012 | Nakahara .............. G06F 13/385 358/1.13 |

(Continued)

FOREIGN PATENT DOCUMENTS

JP  2014-017707 A  1/2014

*Primary Examiner* — Gabriel Garcia
(74) *Attorney, Agent, or Firm* — Canon U.S.A., Inc. IP Division

(57) ABSTRACT

An information processing apparatus communicating with a management apparatus, in which an import instruction of setting information is received and, if the information processing apparatus is an apparatus which synchronizes the setting information with the management apparatus, predetermined setting information is set as a non-import-target among import target setting information.

16 Claims, 17 Drawing Sheets

(56) References Cited

U.S. PATENT DOCUMENTS

2015/0229809 A1\* 8/2015 Fujii .................... H04N 1/4406
                                                    358/1.16
2016/0261771 A1\* 9/2016 Fujii .................. H04N 1/00244

\* cited by examiner

FIG. 9

```
<setting>
   <individual setting>
      <user id="511">
         <preference>
            <address1>
               <destination>sato@canon.com</destination>
            </address1>
         </preference>
      </user>
      <user id="512">
         <preference>
            <address1>
               <destination>ii@canon.com</destination>
            </address1>
         </preference>
      </user>
   </individual setting>
   <network setting>
      <ipaddress>192.168.0.1</ipaddress>
   </network setting>
   <print setting>
      <settings>
         <pattern>0</pattern>
      </settings>
   </print setting>
   <group setting>
      <group id="group_a">
         <preference>
            <print_settings1>
               <colormode>BW</colormode>
            </print_settings1>
         </preference>
      </group>
      <group id="group_b">
         <preference>
            <print_settings1>
               <colormode>CL</colormode>
            </print_settings1>
         </preference>
      </group>
   </group setting>
</setting>
```

FIG. 11

```
<setting type="personal data">
   <individual setting>
      <user id="511">
         <preference>
            <address1>
               <destination>sato@canon.com</destination>
            </address1>
         </preference>
      </user>
   </individual setting>
</setting>
```

1101

INFORMATION PROCESSING APPARATUS FOR IMPORTING SETTING INFORMATION IN A SYNCHRONOUS MANAGEMENT ENVIRONMENT, METHOD FOR CONTROLLING INFORMATION PROCESSING APPARATUS AND STORAGE MEDIUM ON WHICH COMPUTER READABLE PROGRAM IS STORED

BACKGROUND OF THE INVENTION

Field of the Invention

The present invention relates to an information processing apparatus, a method for controlling an information processing apparatus, and a program.

Description of the Related Art

Storage and centralized management of master data of setting values set in an image forming apparatus, which is an exemplary information processing apparatus, in a server (a management apparatus) and the like connected via a network has been proposed. In such management, the image forming apparatus and the server are made to communicate with each other so that the setting value in the image forming apparatus and the master data in the server are synchronized.

For example, when the master data in the server is changed, the image forming apparatus acquires the changed value and changes a value of the setting value in the self apparatus. If the setting value in the image forming apparatus is changed, the image forming apparatus transmits the changed value to the server, and the server reflects the value on the master data. With this configuration, the server can confirm the synchronization status and the setting value of each image forming apparatus of a management target by the master data. Hereafter, this environment will be referred to as a synchronous management environment. In the synchronous management environment, the image forming apparatus can perform synchronous communication with the server to synchronize the setting value in the self apparatus with the master data in the server.

An export function to collectively take out the setting values held by the image forming apparatus outside the image forming apparatus, and an import function to collectively change the setting values in the image forming apparatus are also proposed. Hereafter, the export function and the import function are collectively referred to as a collective distribution process. During the import of the setting values in the collective distribution process depending on the environments, a user may not want to import a part of the settings. Japanese Patent Laid-Open No. 2014-17707 discloses, a configuration in which only an electronic certificate of an encryption system supported by an image forming apparatus is imported.

In a synchronous management environment, when, for example, a new image forming apparatus is added, an administrator or a service engineer may import setting values in a collective distribution process.

However, it is premise that the latest information about individual setting and group setting is always changed in the synchronous management environment. Therefore, there is a problem that, when individual setting and group setting are imported, import results are notified to a management server from the image forming apparatus and the latest information in the management server is deleted.

SUMMARY OF THE INVENTION

The present invention enables realization of a mechanism for setting predetermined setting information to be a non-import target or a non-export target when an import instruction or an export instruction about the setting information is accepted from a user.

One aspect of the present invention provides an information processing apparatus communicating with a management apparatus, including: a receiving unit configured to receive an import instruction with respect to setting information including a plurality of setting values; an import unit configured to import the setting information in accordance with the import instruction received by the receiving unit; a control unit configured to control the import unit to set predetermined setting information as a non-import-target among import target setting information of the import unit if the information processing apparatus is an apparatus which synchronizes the setting information with the management apparatus; and an acquisition unit configured to acquire the predetermined setting information from the management apparatus.

Further features of the present invention will become apparent from the following description of exemplary embodiments with reference to the attached drawings.

BRIEF DESCRIPTION OF THE DRAWINGS

FIG. 9 illustrates an exemplary export file.

FIG. 11 illustrates exemplary personal data.

DESCRIPTION OF THE EMBODIMENTS

Figure 1:
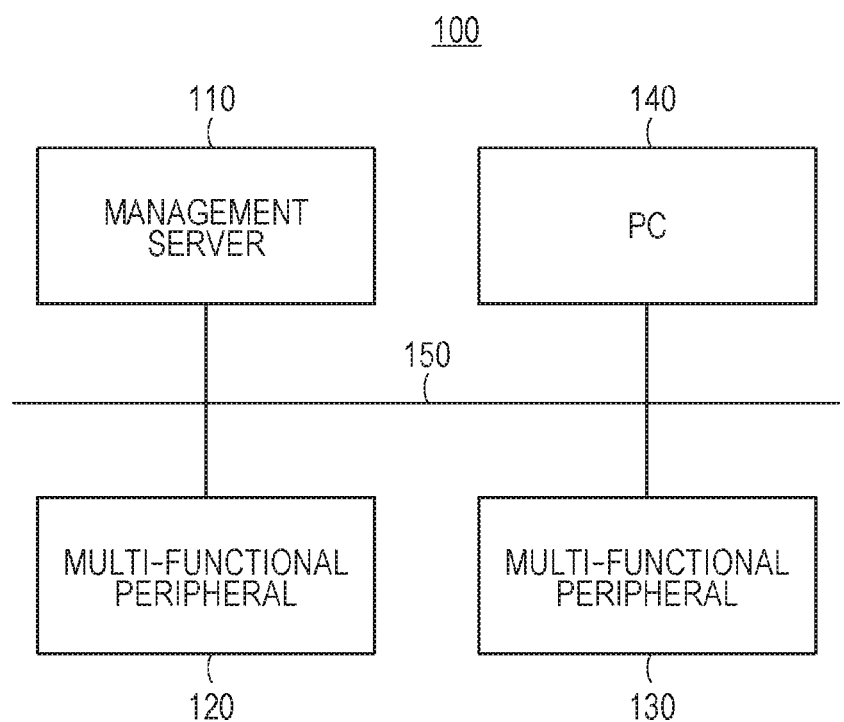
FIG. 1 illustrates a configuration of a data management system.

Hereafter, preferred embodiments of the present invention are described in detail with reference to the accompanying drawings. It will be understood that the following embodiments are illustrative only and not limiting the invention related to the claims, and not all the combinations of the features described in the embodiments are necessary to solve the problems. The same component is denoted by the same reference numeral and description thereof is omitted.
System Configuration

First Embodiment

FIG. 1 illustrates a configuration of a data management system illustrating the present embodiment. A data management system (hereafter, "system") 100 of the present embodiment includes a management server 110, multi-functional peripherals 120 and 130, which are exemplary image forming apparatuses, and a PC 140. These components are mutually connected to be communicable via a network 150. The management server 110 monitors the multi-functional peripherals 120 and 130 (hereafter, collectively referred also to as "device") and, for example, monitors a status, a configuration, and the like of each device. The management server 110 holds master data of the setting values stored in the multi-functional peripherals 120 and 130. The management server 110 can automatically update and synchronize content of the setting values in the multi-functional peripherals 120 and 130 by performing synchronous communication.

The setting value herein is, for example, a device setting value related to each mode, such as a user mode and a service mode. The setting value is, for example, also a user setting value of a custom menu, individual setting, an address book and the like (user data).

Further, the setting value is a setting value of a device configuration, license information, a device operation status, and the like (configuration information). The synchronous communication includes transmitting, to the opposite apparatus, an acquisition request of data held by an opposite apparatus, and makes content of data in the self apparatus coincide with the content of the acquired data. The synchronous communication also includes transmitting data in the self apparatus to the opposite apparatus at timing at which the data in the self apparatus is changed. Functions performed by the information processing apparatus illustrated in the present embodiment include a printing, copying, transmitting, and facsimile. For the ease of description, the setting information managed by the multi-functional peripheral 120 is identified as device setting information with respect to the setting information of each device managed by the management server 110.

In FIG. 1, when the master data in the management server 110 is changed, the management server 110 notifies change information to the multi-functional peripherals 120 and 130 via the network 150. When the management server 110 receives the change information of the setting value from the multi-functional peripheral 120 or 130, the management server 110 changes the value of the master data in the self apparatus. In this manner, in the data management system 100, the setting values are synchronized between the management server 110 and the multi-functional peripherals 120 and 130. In the data management system 100, since the multi-functional peripheral 120 and the multi-functional peripheral 130 are the same in configuration, the multi-functional peripheral 120 is described as a typical multi-functional peripheral.

The multi-functional peripheral 120 is a multi-functional peripheral (MFP) that executes plural types of functions, such as copying and facsimile, and stores, in an internal storage area, setting values which are used when these functions are performed. Here, when the setting value is changed, the multi-functional peripheral 120 notifies the change information to the management server 110 via the network 150. When the multi-functional peripheral 120 receives the change information of the master data from the management server 110, the multi-functional peripheral 120 changes a value of the setting value in the self apparatus. The setting values may be synchronized between the multi-functional peripheral 120 and the multi-functional peripheral 130 depending on the setting values.

When the master data in the management server 110 is changed, the change information of the setting value is notified to both the multi-functional peripherals 120 and 130. If either of the setting value of the multi-functional peripheral 120 or multi-functional peripheral 130 is changed, the change information is first notified from one of the multi-functional peripherals to the management server 110 as described above, and the change information is then notified to the other of the multi-functional peripherals via the management server 110.

The PC 140 is an information processing apparatus that is communicable with the management server 110 and the multi-functional peripheral 120 via the network 150. The PC 140 has a general web browser and can use the functions of the management server 110 and the multi-functional peripheral 120 remotely.

Figure 2:
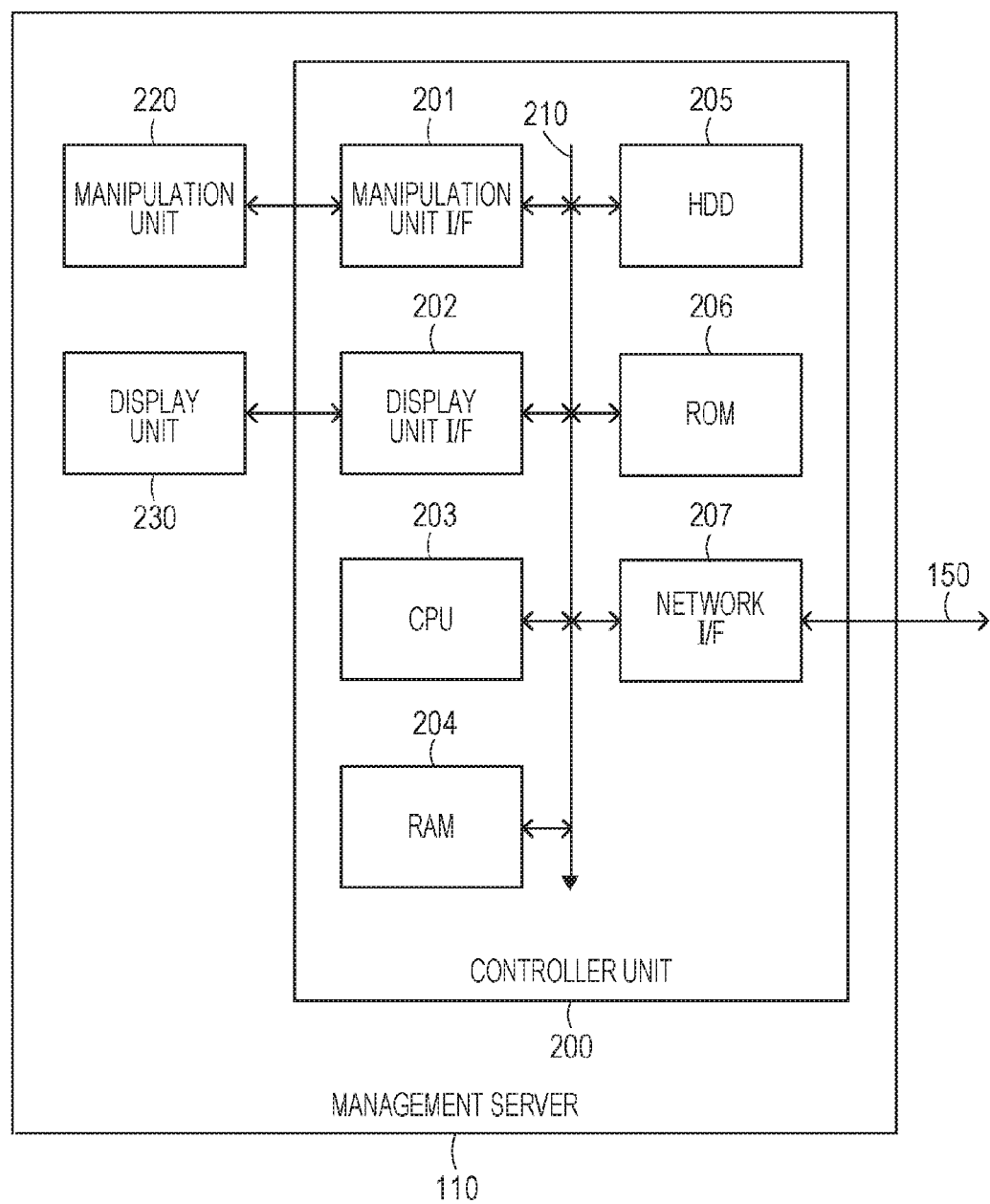
FIG. 2 is a block diagram illustrating a configuration of a management server.

FIG. 2 is a block diagram of a configuration of the management server 110 illustrated in FIG. 1.

In FIG. 2, the management server 110 includes a controller unit 200, a manipulation unit 220, and a display unit 230. The controller unit 200 includes a CPU 203. The CPU 203 starts an OS by a hoot program stored in ROM 206. The CPU 203 executes an application program (hereafter, "application") stored in a hard disk drive (HDD) 205 to perform various processes on the OS. RAM 204 is used as working memory of the CPU 203.

The HDD 205 stores applications, master data, and the like. A method for managing the master data is described later. A manipulation unit I/F 201, a display unit I/F 202, and a network I/F 207 in addition to the ROM 206 and the RAM 204 are connected to a system bus 210. The manipulation unit I/F 201 is an interface with the manipulation unit 220 including a pointing device, a keyboard, and the like, which transmits information input from a user via the manipulation unit 220 to the CPU 203. The display unit I/F 202 outputs screen data to be displayed on the display unit 230 including a display and the like to the display unit 230. The network I/F 207 transmits and receives data to and from each apparatus on the network 150.

Figure 3:
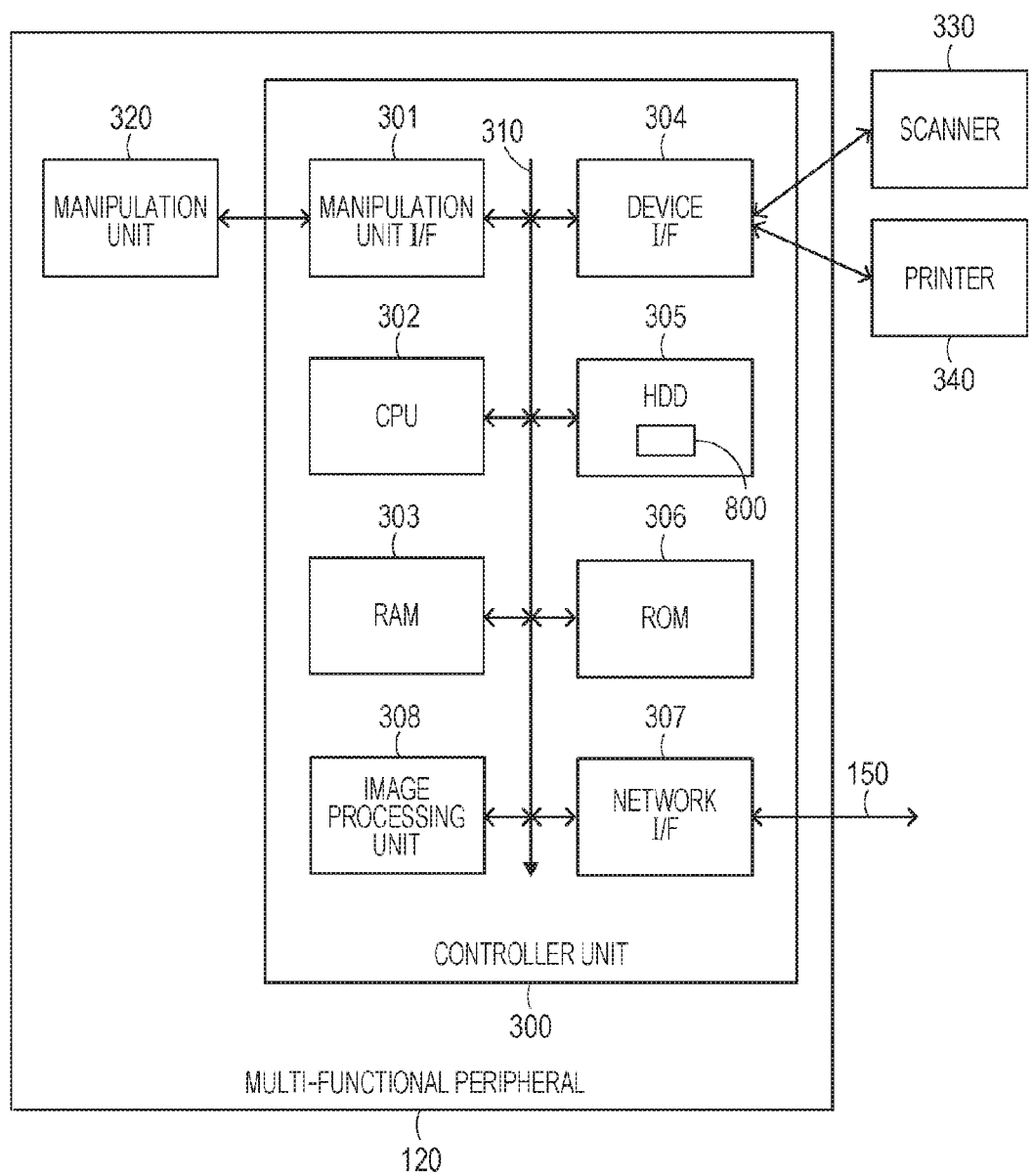
FIG. 3 is a block diagram illustrating a configuration of a multi-functional peripheral.

FIG. 3 is a block diagram of a configuration of the multi-functional peripheral 120 illustrated in FIG. 1. The multi-functional peripheral 130 has the same configuration.

In FIG. 3, the multi-functional peripheral 120 includes a controller unit 300, a manipulation unit 320, a scanner 330, and a printer 340. The controller unit 300 is connected to the manipulation unit 320, the scanner 330 which is an image input device, and the printer 340 which is an image output device.

In the controller unit 300, the CPU 302 starts the OS by the boot program stored in ROM 306. The CPU 302 executes an application program (hereafter, "application") stored in a hard disk drive (HDD) 305 to perform various processes on the OS. RAM 303 is used as working memory of the CPU 302 or as an image memory region for storing image data temporarily. The HDD 305 stores applications, image data, and setting values. A method for managing the setting values in the multi functional peripheral 120 is described later.

A manipulation unit I/F 301, a device I/F 304, a network I/F 307, and an image processing unit 308 in addition to the ROM 306 and the RAM 303 are connected to the system bus 310. The manipulation unit I/F 301 is an interface with the manipulation unit 320 including a touchscreen and the like, which outputs screen data to be displayed on the manipulation unit 320 to the manipulation unit 320. The manipulation unit I/F 301 transmits information input from a user via the manipulation unit 320 to the CPU 302. The device I/F 304 is connected with the scanner 330 and the printer 340 to switch between synchronous/asynchronous of the image data. The network I/F 307 transmits and receives data to and from each apparatus on the network 150. The image processing unit 308 inputs image data read by the scanner 330, outputs the image data to the printer, performs rotation/compression of an image, changes resolution, changes color spaces, changes a gray scale, and the like.

Figure 4:
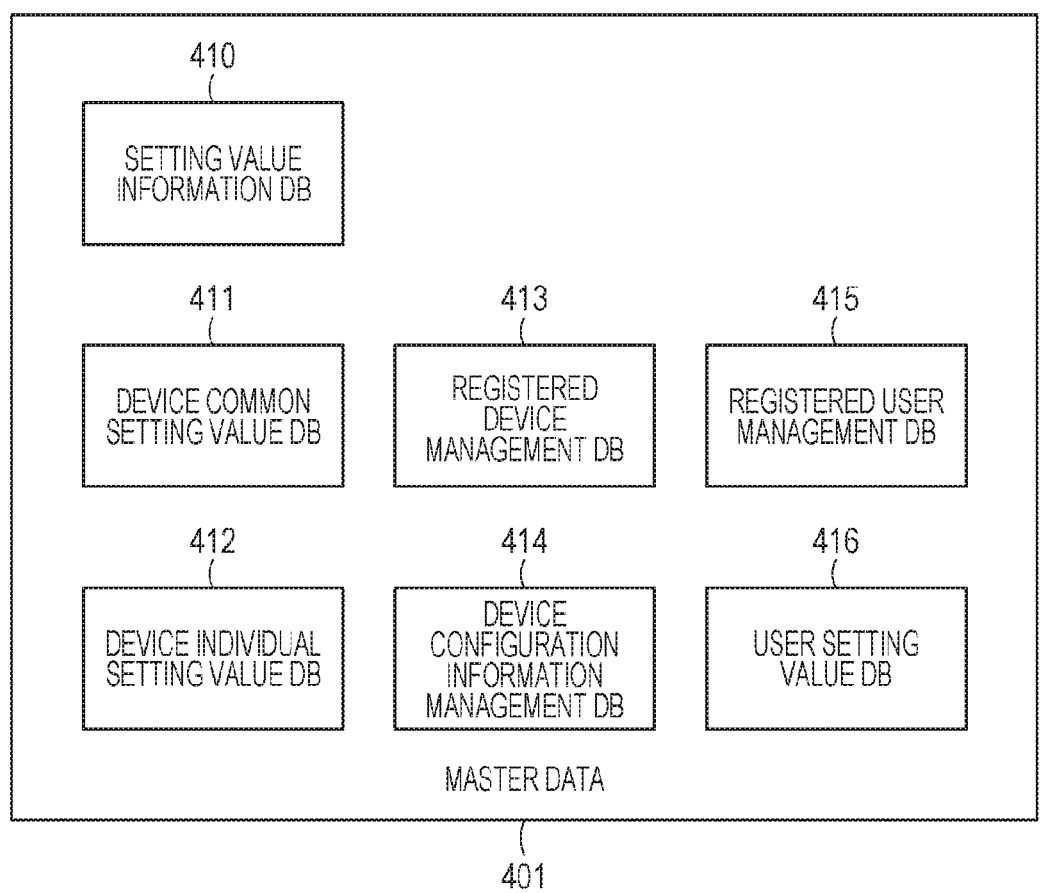
FIG. 4 is a block diagram illustrating master data managed by the management server.

FIG. 4 is a block diagram of a configuration of the master data held and managed by the management server 110 illustrated in FIG. 1. In the present embodiment, the setting information managed by the management server 110 includes function setting information, network setting information, user setting information, and group setting information.

In FIG. 4, master data 401 includes a setting value about device and a setting value about user. The setting value about device includes a setting value information database (DB) 410, a device common setting value DB 411, a registered device management DB 413, a device individual setting value DB 412, and a device configuration information management DB 414. The setting value about user includes a registered user management DB 415 and a user setting value DB 416. Regarding the setting value information DB, exemplary data stored in the setting value information DB 410 is shown in Table 1.

TABLE 1

SETTING VALUE INFORMATION DB

| KEY IDENTIFIER | UI DISPLAY WORD | INITIAL VALUE | RANGE OF VALUES | APPLICABLE MODEL/FIRMWARE VERSION | DISPLAY CONDITION |
|---|---|---|---|---|---|
| settings.pattern | GROUND TINT PRINTING | 0 | 0-1 | MODEL A/ALL MODEL B/ALL MODEL C/SINCE V3.01 | GROUND TINT LICENSE |
| settings.density | PRINTING DENSITY | 5 | 0-10 | MODEL A/ALL MODEL B/SINCE V2.01 | — |
| settings.density | PRINTING DENSITY | 3 | 0-6 | MODEL B/BEFORE V1.99 MODEL C/ALL | — |
| ... | | | | | |

The setting value information DB 410 is a database storing metadata about each setting value managed by the management server 110. The setting value information DB 410 includes words to be presented to the user, a key identifier for identifying a setting value when communication with the device is made, the initial value, a range of values, applicable models/firmware versions, and display conditions of the setting values (e.g., required license names). Each setting value managed by the setting value information DB 410 may have different range of setting values or initial values depending on the model of the device or dependence on firmware version. For example, the table of the setting value information DB shows that the setting value identified by a key identifier "settings.pattern" exists in all of the individual devices of model A and model B, whereas the same setting value exists only in the individual device of since firmware version 3.01 in model C. The setting value identified by the key identifier "settings.density" represents that the range of setting values and the initial values vary depending on the installed firmware version in model B. Regarding the device common setting value DB, exemplary data stored in the device common setting value DB 411 is shown in Table 2.

TABLE 2

DEVICE COMMON SETTING VALUE DB

| KEY IDENTIFIER | VALUE | LATEST UPDATE TIME AND DATE |
|---|---|---|
| settings.pattern | 0 | 2013/9/9/12:01 |
| settings.density | 6 | 2013/9/8/17:35 |
| ... | | |

The device common setting value DB 411 is a database for managing setting values shared by all of a plurality of management target devices of the management server 110. In the device common setting value DB 411, the key identifiers, values corresponding to the identifiers, and the latest update time and date of the setting value are stored. The key identifiers are of the same system as those in the setting value information DB 410. Regarding the device individual setting value DB, exemplary data stored in the device individual setting value DB 412 is shown in Table 3.

TABLE 3

DEVICE INDIVIDUAL SETTING VALUE DB

| GROUP | KEY IDENTIFIER | VALUE | UPDATE TIME AND DATE |
|---|---|---|---|
| PRINT SETTING | settings.pattern | 1 | 2013/5/9/18:42 |
| PRINT SETTING | settings.density | 4 | 2013/6/18/17:12 |
| NETWORK SETTING | ipaddress | 192.168.0.2 | 2013/1/4/9:00 |
| ... | | | |

The device individual setting value DB 412 is a database for managing setting values different among a plurality of management target devices of the management server 110. A plurality of device individual setting value DBs 412 exist corresponding to each of the multi-functional peripherals. The device individual setting value DB 412 stores groups, key identifiers, values corresponding to the identifiers, and the latest update time and date of the setting value. The key identifiers are of the same system as those in the setting value information DB 410. The setting values stored in the multi-functional peripheral 120 are roughly classified into the groups. For example, in the table of the device individual setting value DB, the setting of which key identifier is "settings.pattern" is included in the group of "print setting."

Regarding the registered device management DB, exemplary data stored in the registered device management DB 413 is shown in Table 4.

TABLE 4

REGISTERED DEVICE MANAGEMENT DB

| DEVICE ID | INDIVIDUAL DEVICE IDENTIFIER |
|---|---|
| 501 | INDIVIDUAL DEVICE 1 |
| 502 | INDIVIDUAL DEVICE 2 |
| ... | |

The registered device management DB 413 is a database for managing information about the management target devices of the management server 110. The registered device management DB 413 stores device IDs for uniquely identifying the management target devices, individual device identifiers for identifying individual devices, and the like. Identification information that may be uniquely distinguished in the data management system 100 may be used as, for example, the device ID, and a MAC address may be used as, for example, the individual device identifier.

Regarding the device configuration information management DB, exemplary data stored in the device configuration information management DB 414 is shown in Table 5.

TABLE 5

DEVICE CONFIGURATION INFORMATION MANAGEMENT DB

| ATTRIBUTE | VALUE |
|---|---|
| INDIVIDUAL DEVICE IDENTIFIER | INDIVIDUAL DEVICE 1 |
| MODEL NAME | MODEL A |
| FIRMWARE VERSION | 0.01 |
| INSTALLED LICENSE | GROUND TINT LICENSE |
| ACCESSORY | Finisher-X |
| OPERATION STATUS | SYNCHRONOUS COMMUNICATION MODE: SYNCHRONOUS |

The device configuration information management DB 414 represents the content of the device configuration information of each individual device. A plurality of device configuration information management DBs 414 exist corresponding to each of the devices. The device configuration information includes individual device identifiers for identifying individual devices, model names, firmware versions, installed license information representing available functions, accessories, and operation statuses of individual devices. Model names, firmware versions, and licenses in the device configuration information management DB are information of the same system as those of the information stored in the setting value information DB 410. The operation status represents, for example, whether an individual device is in a synchronous communication mode or in an asynchronous communication mode.

In the synchronous communication mode, a database as illustrated in FIG. 4 exists in the management server 110 and the device performs synchronous communication with the management server 110 at constant time intervals so that data in the management server 110 and data in the self apparatus are synchronized by the synchronous communication. In the asynchronous communication mode, synchronous communication with the management server 110 is not performed.

The synchronous communication mode also includes a suspension status of the synchronous communication and a transition to suspension status. That is, the suspension status, the transition to suspension status, and a suspension released status are included. Four kinds of status including synchronization exist. Synchronous communication is suspended when, for example, the multi-functional peripheral 120 is disconnected from the network 150 and moved. The synchronous communication mode and the asynchronous communication mode are set by the CPU 302.

Regarding the registered user management DB, exemplary data stored in the registered user management DB 415 is shown in Table 6.

TABLE 6

REGISTERED USER MANAGEMENT DB

| USER ID | USER NAME | First name | Last name | GROUP NAME |
|---|---|---|---|---|
| 511 | sato | TAKASHI | SATO | GROUP A |
| 512 | ii | RYOUKO | II | GROUP B |
| ... | | | | |

The registered user management DB 415 is a database for managing information about a user using the device. The registered user management DB 415 stores user IDs for uniquely identifying users, user names input by the users at the time of login, names of the groups to which the users belong, and the like. Regarding the user setting value DB, exemplary data stored in the user setting value DB 416 is shown in Table 7.

TABLE 7

USER SETTING VALUE DB

| USER ID | KEY IDENTIFIER | VALUE | LATEST UPDATE TIME AND DATE |
|---|---|---|---|
| 511 | preference.print_settings1 | {colormode:"BW",copies:"3"} | 2013/2/4/2:01 |
| 511 | preference.print_settings2 | {colormode:"CL",quality:"low"} | 2013/2/3/7:35 |
| 511 | preference.address1 | {destination:"sato@canon.com"} | 2013/8/30/3:01 |
| 511 | preference.address2 | {destination:"user1@canon.com"} | 2013/1/13/2:16 |
| ... | | | |

The user setting value DB 416 is a database for managing the setting value for each user that can be used by each user of the device. The user setting value DB 416 stores user IDs for uniquely identifying the users, key identifiers for uniquely identifying the setting values, content of the setting values, and the latest update time and date of the setting value. For example, in a user print setting 1 identified by a user ID 511, "color mode: monochrome, number of copies: 3" are set. The user IDs are of the same system as those in the registered user management DB 415.

With each database of the master data 401, the management server 110 can manage setting values which are different in each of the management target devices, setting values common to all the management target devices, metadata of each setting value, and user data in a centralized manner.

Regarding the setting value DB, an exemplary setting value DB 800 stored in the HDD 305 of the device is shown in Table 8.

TABLE 8

SETTING VALUE DB

| GROUP | KEY IDENTIFIER | VALUE | UI DISPLAY WORD | INITIAL VALUE | RANGE OF VALUES | DISPLAY CONDITION |
|---|---|---|---|---|---|---|
| PRINT SETTING | settings.pattern | 1 | GROUND TINT PRINTING | 0 | 0-1 | GROUND TINT LICENSE |
| PRINT SETTING | settings.density | 4 | PRINTING DENSITY | 5 | 0-10 | — |
| . . . | | | | | | |

The setting value DB 800 is a database storing setting values used in the devices. The setting values stored in the setting value DB 800 include key identifiers for identifying the setting values, values of the setting values, and UI display word, initial value, range of values, display conditions, and the like. These elements are information of the same system as those in the table of the setting value information DB managed by the master data 401. When the setting value is changed in the management server 110 or the device, synchronous communication of the setting value is performed with the communication destination apparatus using the key identifier and the value shown in Table 8. The synchronous communication of each setting value is performed by the network I/F 207 of the management server 110 and the network I/F 307 of the device via the network 150.

Data of the same system as those of data shown in the table of the setting value DB, data shown in the table of the device individual setting value DB, and data shown in the table of the user setting value DB is also stored in the HDD 305 of the device. When the setting value is changed in the management server 110 or the device, synchronous communication of the setting value is performed with the communication destination apparatus using the user ID.

Figure 5:
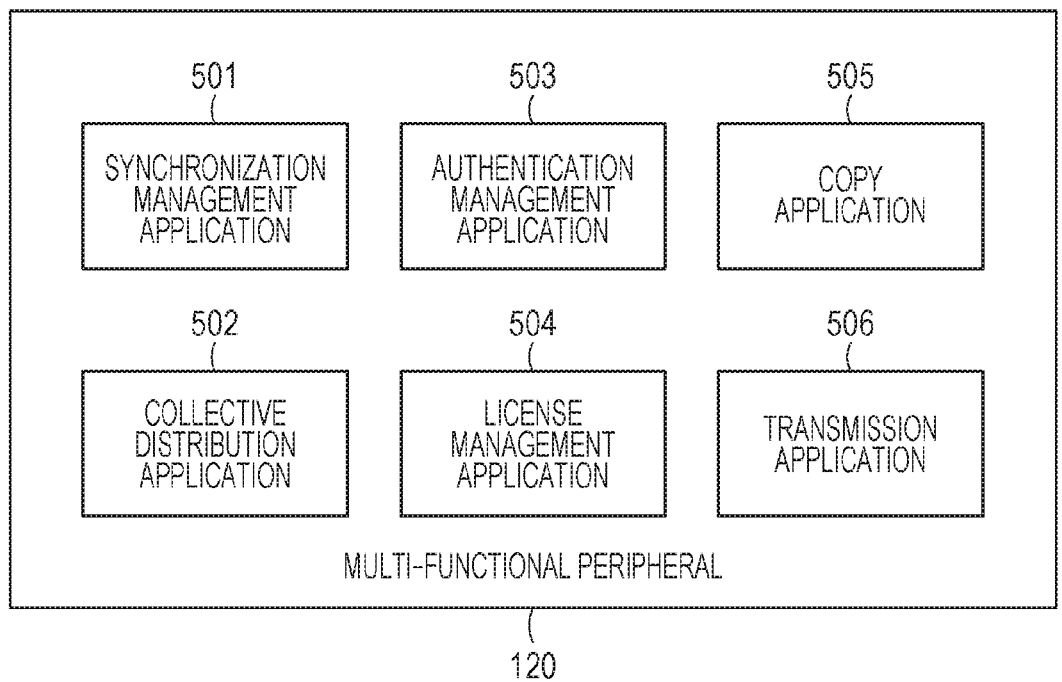
FIG. 5 illustrates each application operating on the multi-functional peripheral.

FIG. 5 illustrates each application operating on the multi-functional peripheral 120 illustrated in FIG. 1. Each application is stored in either of the RAM 303, the HDD 305, or the ROM 306, and each embodiment is implemented by being read and executed by the CPU 302.

In FIG. 5, a synchronization management application 501 is an application which performs synchronous communication control of setting values with the management server 110. Detailed description is given later with reference to FIG. 6.

A collective distribution application 502 is an application which collectively imports and exports the setting values, held by the multi-functional peripheral 120. Here, "importing" refers to rewriting the setting values stored in the HDD 305 of the multi-functional peripheral 120 and the like based on the data of the setting values existing outside the multi-functional peripheral 120. "Exporting" refers to extracting the setting values stored in the HDD 305 of the multi-functional peripheral 120 and the like outside the multi-functional peripheral 120. Detailed description is given later with reference to FIG. 7.

An authentication management application 503 is an application which identifies a user using the multi-functional peripheral 120 and determines operation right. When using the multi-functional peripheral 120, the user inputs an identifier and a password through the manipulation unit 320. The input information is compared with the information stored in an unillustrated user DB so that user is identified and operation right is determined.

A license management application 504 is an application holding a license for the validation and invalidation of functions provided by the multi-functional peripheral 120. Detailed description is given later with reference to FIG. 16. A copy application 505 is an application which provides a copy function. The copy function is a general function to copy a document by printing the document, which is read with the scanner 330, with the printer 340. The user instructs to use the copy function via the manipulation unit 320.

A transmission application 506 is an application which provides the transmission function. The transmission function is a general function which transmits digital data of the document read with the scanner 330 to another information equipment via the network I/F 307. The digital data is converted into desired format by the image processing unit 308. For example, an encrypted PDF transmission function to transmit digital data in an encrypted PDF format may be provided. The encrypted PDF transmission function may be validated by a license management application described later.

Figure 16:
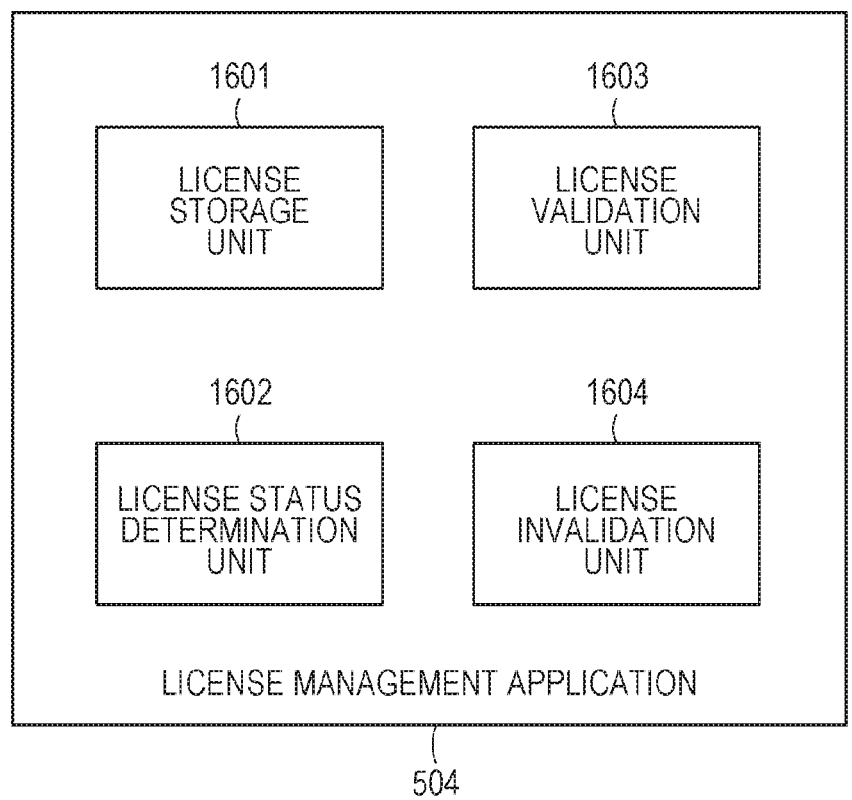
FIG. 16 illustrates a block configuration of a license management application.

FIG. 16 illustrates a block configuration of a license management application 504 illustrated in FIG. 5. Hereafter, each block constituting the license management application 504 is described. In FIG. 16, the license management application 504 is stored in either of the RAM 303, the HDD 305, or the ROM 306. When the license management application 504 is read and executed by the CPU 302, synchronous communication control of each embodiment is implemented. A license storage unit 1601 manages access, such as writing and reading out, to a license DB and stores the result. Regarding the license DB, an exemplary license DB 900 stored in the HDD 305 of the device is shown in Table 9.

TABLE 9

LICENSE DB

| FUNCTION NUMBER | FUNCTION NAME | STATUS |
|---|---|---|
| 1 | SYNCHRONOUS MANAGEMENT FUNCTION | VALID |
| 2 | ENCRYPTED PDF TRANSMISSION FUNCTION | INVALID |

The license DB 900 is a database which stores whether the function provided by the multi-functional peripheral 120 is valid or invalid. Information about the license stored in the license DB 900 includes function numbers, function names, and the status of the function.

A license status determination unit 1602 determines the status of the function identified by the function number with respect to the license DB stored in a license storage unit 1601. For example, when a license status of a function number 1 shown in Table 9 is inquired, the status of the synchronous controlling function is determined to be "valid." When providing a function controlled by the license, the application which operates on the multi-functional peripheral 120 determines whether the function can be provided or not based on the inquiry result to the license status determination unit 1602. For example, the transmission application 506 inquires the license status determination unit 1602 at a function number 2. When it is determined that the encrypted PDF transmission function is "invalid," the transmission application 506 controls that the encrypted PDF transmission function is not used.

The license activation unit 1603 determines validity of the license in accordance with the license input via the manipulation unit 320, and validates the license status of the corresponding function. Therefore, the license requires the function number for identifying corresponding function and electronic signature data for determining validity. A license deactivation unit 1604 invalidates the license status of the corresponding function by accepting a request for license invalidation via the manipulation unit 320.

Figure 6:
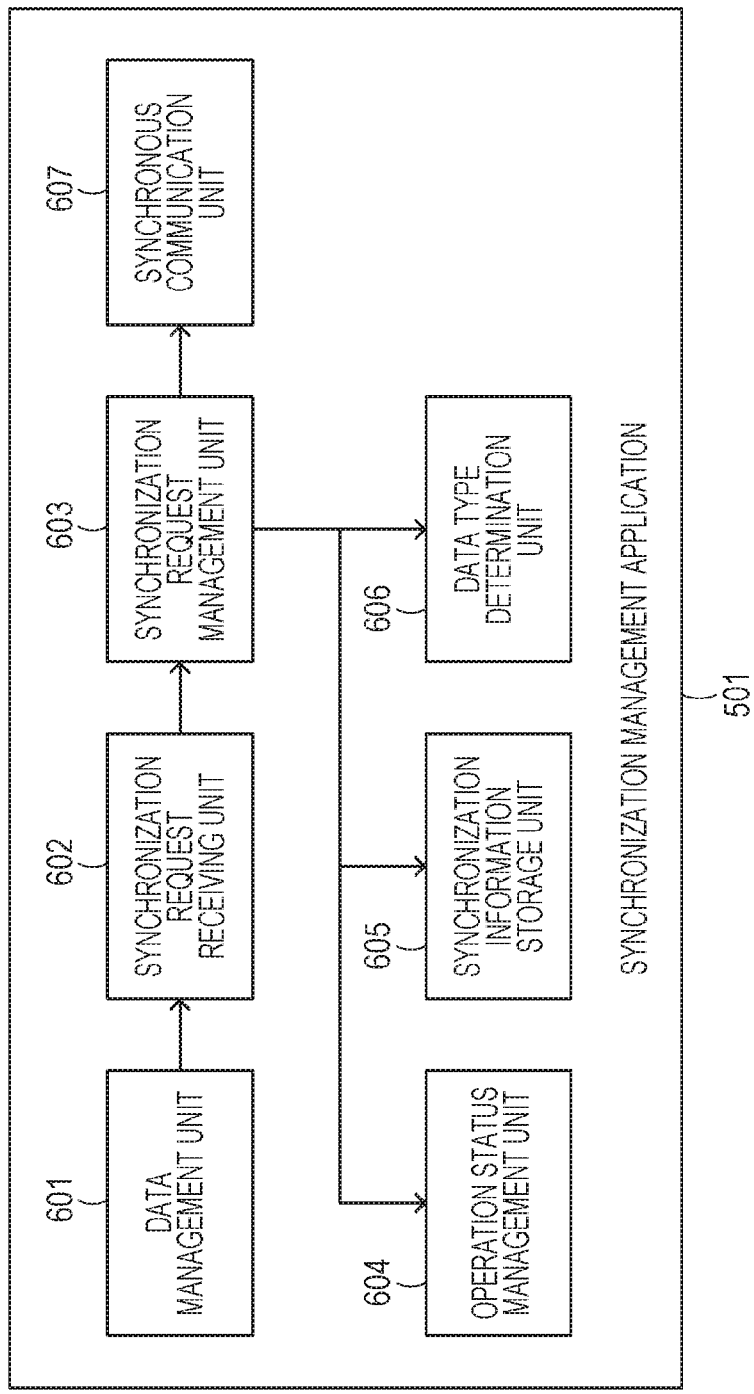
FIG. 6 illustrates a block configuration of a synchronization management application.

FIG. 6 illustrates a block configuration of the synchronization management application 501 illustrated in FIG. 5. Hereafter, each block constituting the synchronization management application 501 is described.

In FIG. 6, the synchronization management application 501 is stored in either of the RAM 303, the HDD 305, or the ROM 306. When the synchronization management application 501 is read and executed by the CPU 302, synchronous communication control of each embodiment is implemented.

A data management unit 601 manages access, such as writing and reading out, to the setting value DB 800 shown in Table 8. When a data change request of the setting value DB 800 or the user setting value is issued, the data management unit 601 outputs a synchronization request of the change content to a synchronization request receiving unit 602. The data change request is, for example, a data editing request from the user, and is accepted via a user interface screen and the like. The synchronization request includes a data type, a key identifier for identifying a setting value, a value of the setting value, request-accepted time and, if setting value is a user setting value, a user ID and a user name. The synchronization request receiving unit 602 receives synchronization requests from the data management unit 601, and notifies a synchronization request management unit 603 of the synchronization requests in the received order.

The synchronization request management unit 603 determines whether synchronous communication is to be performed with the management server 110 using the notified synchronization request, the operation status management unit 604 and a data type determination unit 606. If it is determined that synchronous communication is to be performed, the synchronization request management unit 603 stores the notified synchronization request in a storage area by the synchronization information storage unit 605. When synchronous communication is performed with the management server 110, the notified synchronization request is output to a synchronous communication unit 607. The operation status management unit 604 determines the license status of the synchronization management application 501 using the license status determination unit 1602. If the license status of the synchronization management application 501 is "invalid," it is determined that the device is in the asynchronous communication mode. If the license status of the synchronization management application 501 is "valid," it is determined whether the multi-functional peripheral 120 is in the synchronous communication mode or in the asynchronous communication mode and, if in the synchronous communication mode, it is further determined whether the multi-functional peripheral 120 is in the synchronization status, the suspension status, the transition to suspension status, or the suspension released status. The determination result is notified to the synchronization information storage unit 605.

The synchronization information storage unit. 605 stores information about the accepted synchronization request in the storage area. The synchronization information storage unit 605 stores information about the accepted synchronization request in a storage area, such as the HDD 305, in a file format. The data type determination unit 606 determines whether the accepted synchronization request includes either type of data among the device setting value, the user setting value, and the configuration information. The synchronous communication unit 607 performs synchronous communication with the management server 110 via the network I/F 207 using the synchronization request output from the synchronization request management unit 603.

Figure 7:
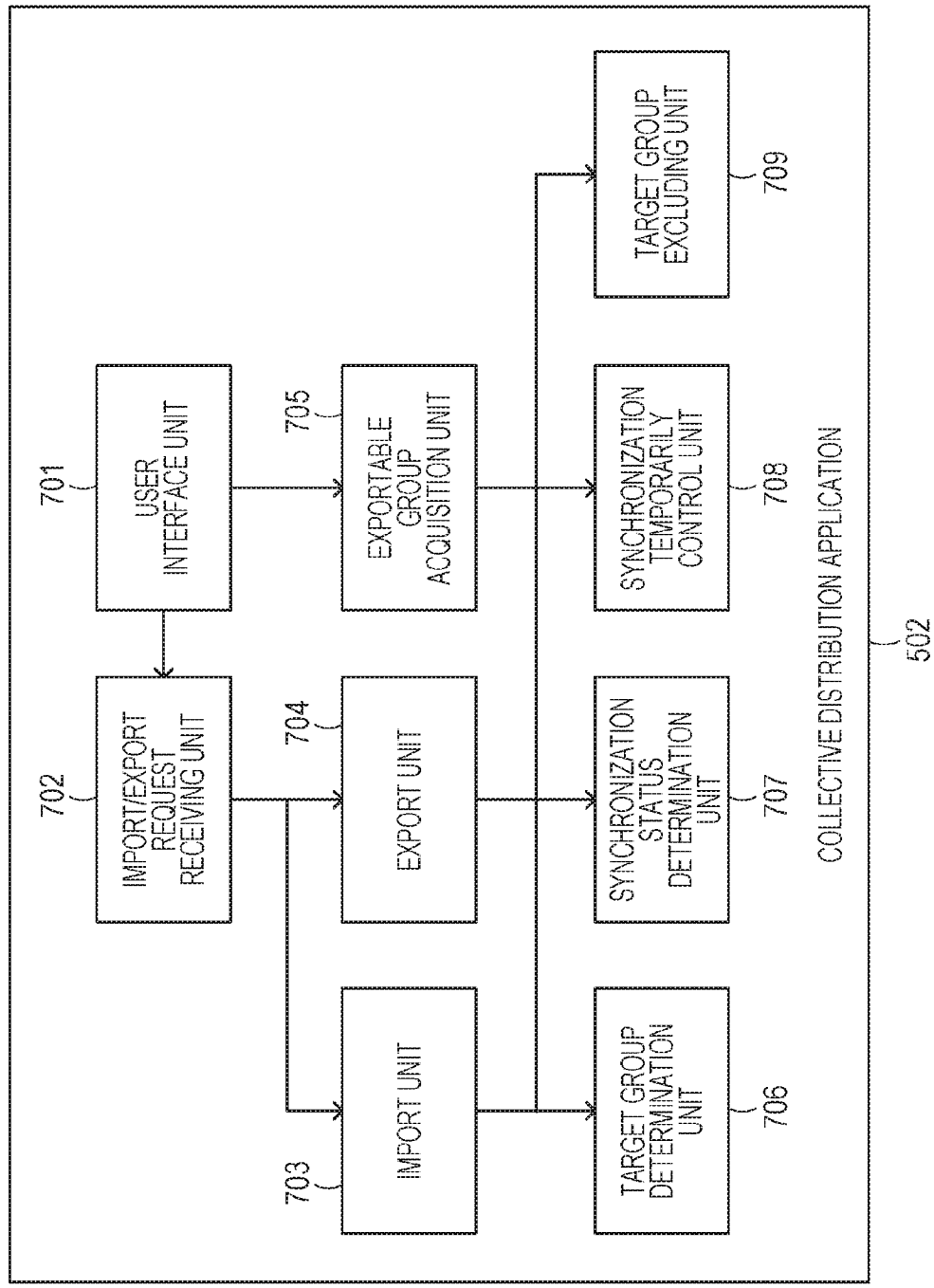
FIG. 7 illustrates a block configuration of a collective distribution application.

FIG. 7 illustrates a block configuration of the collective distribution application 502 illustrated in FIG. 5. Hereafter, each block constituting the collective distribution application 502 is described.

In FIG. 7, the collective distribution application 502 is stored in either of the RAM 303, the HDD 305, or the ROM 306. When the collective distribution application 502 is read and executed by the CPU 302, synchronous communication control of each embodiment is implemented.

A user interface unit 701 performs operation and display of the multi-functional peripheral 120 via the manipulation unit 320 and the manipulation unit I/F 301. Here, an import request and an export request are issued in accordance with the user operation, and the result is displayed.

Figure 8:
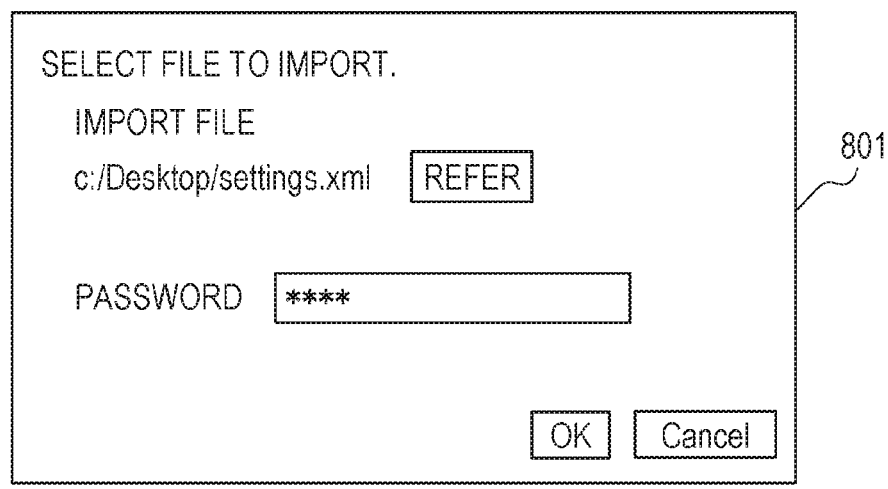
FIG. 8 illustrates an exemplary UI screen displayed on a PC.

An exemplary screen on which an import request is issued is illustrated in FIG. 8. Illustrated is an exemplary screen on which an import request is issued via a web browser of the PC 140 illustrated in FIG. 1. When a file in which the setting value to import is stored is designated, a password is entered, and an OK button is pressed, the import request is accepted.

An exemplary file in which the setting value to import is stored is illustrated in FIG. 9. Although an import file written in the XML form is illustrated as an example, the file format is not limited to the same. A "print setting" tag represents a group of setting values to import. The setting values stored in the multi-functional peripheral 120 are roughly classified into the groups. A "settings" tag which is a sub tag of the "print setting" tag and a "pattern" tag are tags representing the key identifiers of the setting values. The value of the "pattern" tag is the setting value to import. Therefore, it is turned out that this import data includes import data in which the setting of the key identifier of the "settings.pattern" in the "print setting" group is set at "0."

Figure 10A:
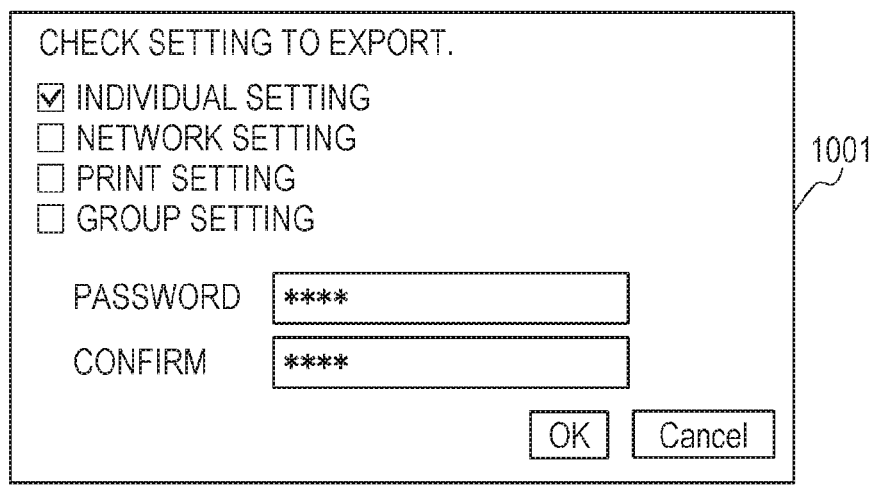
FIGS. 10A to 10C illustrate exemplary UI screens displayed on a manipulation unit.

An exemplary screen on which an export instruction request is issued is illustrated in FIG. 10A. In this example, four groups of "individual setting," "network setting," "print setting," and "group setting" are displayed on the screen, and selection of a group of setting values to export using a checkbox is instructed. Thereafter, the user enters the password and presses the OK button, whereby an export process starts. After the export process ends, an export file is downloaded from an unillustrated download screen. The export file is of the same configuration as that of the import file. Exemplary export file and import file are illustrated in FIG. 9, which are called different names depending on the purposes of the operations.

An import/export request receiving unit 702 receives art import request or an export request received via the user interface unit 701. The import/export request receiving unit 702 determines whether the received request is an import request or an export request. If it is determined that the request is an import request, the import/export request receiving unit 702 accepts a setting value as an import target and passes the setting value to an import unit 703, and then instructs a process to the import unit 703. If it is determined that the request is an export request, the import/export request receiving unit 702 accepts a group as an export target and instructs a process to an export unit 704.

The import unit 703 performs execution control of the import process. In the import process, the import file as illustrated in FIG. 9 is read from outside the multi-functional peripheral 120 and updates the setting value held by the multi-functional peripheral 120. The process at this time is described, with reference to the import data of FIG. 9.

When an import instruction is received from the import/export request receiving unit 702, the import unit 703 determines a group included in the import data by a target group determination unit 706. It is found that the import data of FIG. 9 includes four groups of "individual setting," "network setting," "print setting," and "group setting."

Next, an operation status of the synchronization management application 501 is determined by a synchronization status determination unit 707. Regarding the operation status, a status managed by the operation status management unit 604 is acquired. As the status, the synchronous communication mode and the asynchronous communication mode exist as described above. In the synchronous communication mode, the synchronization status, the suspension status, the transition to suspension status, and the suspension released status exist. The synchronization status determination unit 707 determines whether the communication mode is the synchronous communication mode or the asynchronous communication mode. The synchronization status determination unit 707 also determines the status of the synchronization status, the suspension status, the transition to suspension status, and the suspension released status in the synchronous communication mode. The determination is made by the operation status management unit 604 which refers to the license status and the operation status of the synchronization management application 501.

Next, if it is determined by the synchronization status determination unit 707 that the communication status is in the synchronous communication status, a synchronization temporarily control unit 708 suspends a process of synchronizing the setting information managed by the management server 110. The suspension is performed for two purposes. One of the purposes is to eliminate repeated issue of synchronization requests to the management server 110 each time the setting value held by the multi-functional peripheral 120 is sequentially changed in the import process. By releasing the suspension request of synchronization after the import process ends, the content of change of the entire import process is synchronized at once.

The other of the purposes is to prevent competition of changes caused by the synchronization request from the management server 110 and the import process. Although later-priority or former-priority process is possible, the content of report display may be adversely affected by influences of other than the import process when, for example, the result of the import process is to be displayed by report. This problem is avoidable by suspending the synchronization process.

Next, a target group excluding unit 709 deletes a non-import-target group from the import target groups. The non-import-target groups, statically stored in the target group excluding unit 709, are "group setting" and "individual setting."

It is premise that the each user arbitrarily changes and uses the "group setting" and the "individual setting." Therefore, in the data management system by the management server 110, "group setting" and "individual setting" of the master data stored in the management server 110 are considered as the latest data desired by each user. Therefore, in the import process of the collective distribution process, these settings are excluded from the import target group so that the latest data is kept.

In the example in which the import data of FIG. 9 is to import, "group setting" and "individual setting" are excluded from the import target from among the four groups included in the import data. Therefore, "network setting" and "print setting" are the import target groups.

The import unit 703 recognizes, as the import target, only the settings about the groups after exclusion is performed by the target group excluding unit 709, and continues the import process. In the example of FIG. 9, "ipaddress" setting of the "network setting" group is written in the HDD 305 as "192.168.0.1." The "settings.pattern" setting of "print setting" is written in the HDD 305 as "0." After the import process ends, the import unit 703 requests synchronization suspension release to the synchronization temporarily control unit 708. In this manner, the import process is implemented.

The export unit 704 performs execution control of the export process. In the export process, the setting value held by the multi-functional peripheral 120 is read and converted into an export file as illustrated in FIG. 9. The flow of the process is described on the condition that data shown in Table 3 of the device individual setting value DB and data shown in Table 7 of the user setting value DB are stored in the HDD 305.

The export unit 704 receives an export process request from the import/export request receiving unit 702. At this time, export target groups are designated. For example, three groups, "individual setting," "print setting," and "group setting" are designated.

The export unit 704 determines an operation status of the synchronization management application 501 by the synchronization status determination unit 707. If the operation status is determined by the synchronization status determination unit 707 to be synchronization, the synchronization temporarily control unit 708 suspends synchronization. Synchronization is suspended here not to generate export data in a state in which compatibility between the setting values is not maintained since the setting values are unintentionally changed during the export process. Next, a target group excluding unit 709 deletes a non-export-target group from the export target groups. Thus, "individual setting" and "group setting" are excluded, and "print setting" remains as the export target. The export unit 704 writes out only the setting of the export target group to the export file. In the data shown in the table of the device individual setting value DB, "settings.pattern" and "settings.density" are the export target groups of which group is "print setting."

After the export process ends, the export unit 704 requests synchronization suspension release to the synchronization temporarily control unit 708. In this manner, the export process is implemented. An exportable group acquisition unit 705 generates a list of groups of the setting values held by the multi-functional peripheral 120, and returns the list to the request source.

The exportable group acquisition unit 705 may generate the list by referring to a list of groups stored at a predetermined location of the HDD 305. Alternatively, the exportable group acquisition unit 705 may generate the list by retrieving information of the group in the table of the setting value DB. Here, it is supposed that the four groups of, for example, "individual setting," "network setting," "print setting," and "group setting" are exportable.

Next, an operation status of the synchronization management application 501 is determined by the synchronization status determination unit 707. If the operation status is determined by the synchronization status determination unit 707 to be the synchronization status, the target group excluding unit 709 deletes a non-export-target group from the export target groups. The deleted group is stored as a non-export target group. Here, for example, "network setting" and "print setting" remain as the export process targets and "individual setting" and "group setting" are stored as the non-export-target groups.

Figure 10B:
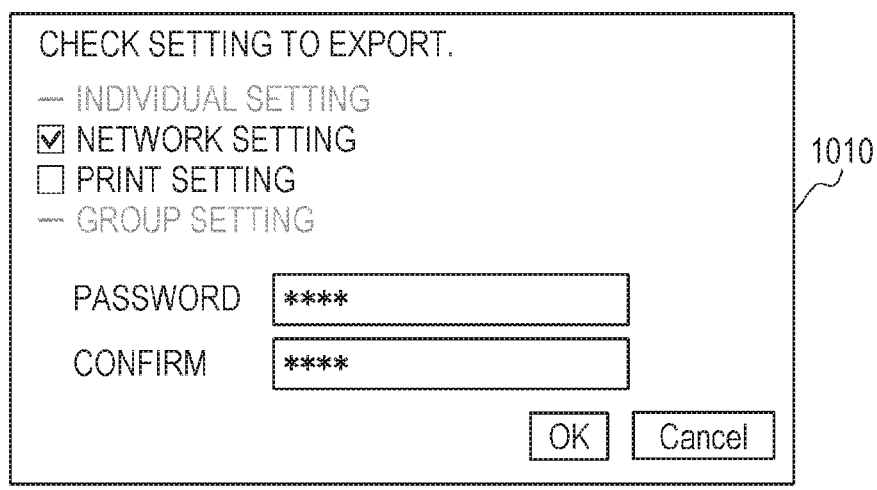

An exemplary export screen displayed in accordance with the determination result is illustrated in FIG. 10B. FIG. 10B shows that "network setting" and "print setting" can be selected as the export targets, and "individual setting" and "group setting" cannot be exported.

Here the fact is described additionally that if an export request is issued to the import/export request receiving unit 702 about only the group acquired by the exportable group acquisition unit 705 in advance, it is not necessary to determine the target group in the export unit 704. For example, if an export request is directly performed via a network, the target group is not necessarily designated accurately. Further, since there is a time lag between an inquiry by the exportable group acquisition unit 705 and the export process by the export unit 704, the synchronization status may be changed during the time lag. Therefore, it is necessary to determine the target group on both the export unit 704 and the exportable group acquisition unit 705.

Figure 12:
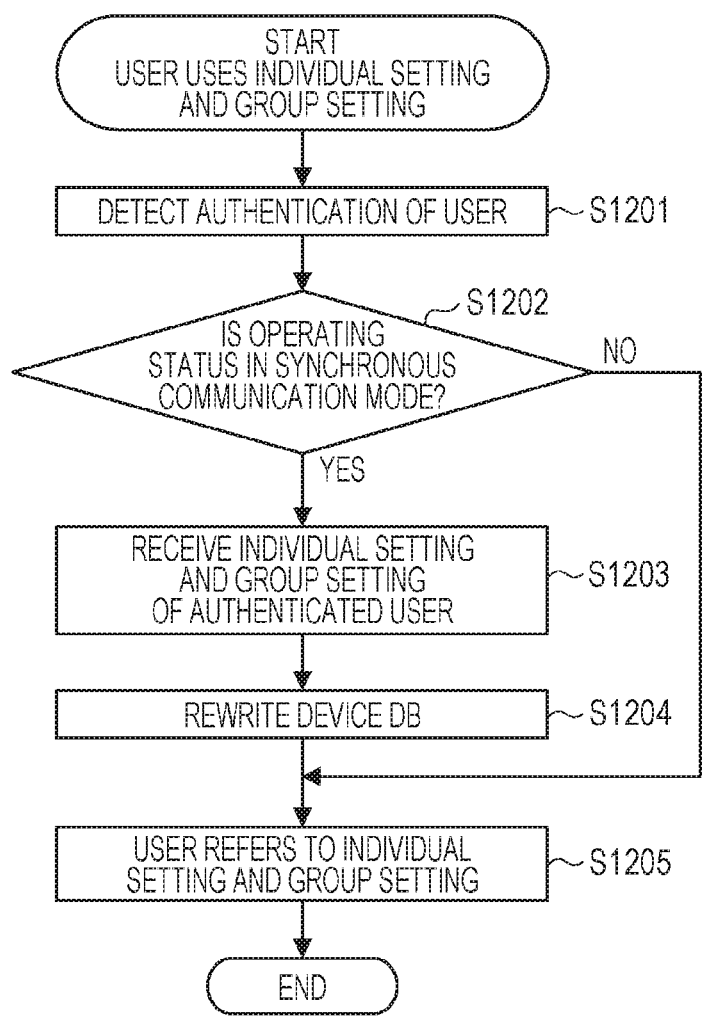
FIG. 12 is a flowchart of a method for controlling an information processing apparatus.

FIG. 12 is a flowchart illustrating a method for controlling the information processing apparatus according to the present embodiment. In this example, the latest user setting value held by the management server 110 is used when the user uses the multi-functional peripheral 120. Hereafter, the multi-functional peripheral 120 is described as an exemplary device. Each step is implemented when the CPU 302 of the multi-functional peripheral 120 executes the stored control program. Hereafter, a module executed by the CPU 302 is described mainly.

In S1201, the authentication management application 503 detects authentication of the user. Which user is using the multi-functional peripheral 120 is thus identified. For example, suppose that a user of user name "sato" identified by the user ID "511" has been authenticated.

In S1202, the operation status management unit 604 of the synchronization management application 501 determines whether the current operation status is the synchronous communication mode. If the operation status management unit 604 determines that the operation status is the synchronous communication mode, the process proceeds to S1203, and if not, the process proceeds to S1205.

In S1203, the synchronous communication unit 607 performs synchronous communication with the management server 110. In this example, since the user of user ID "511" is authenticated in S1201, an acquisition request of a user setting value of the user ID "511" is issued. At the same time, an acquisition request of a group setting of "group A" to which the user of the user ID "511" belongs is issued.

In the example of the user setting value DB of Table 6, four settings corresponding to the user ID "511" shown in Table 7 is transmitted from the management server 110 to the multi-functional peripheral 120. Although the group setting value DB is not illustrated, a group setting similarly associated with "group A" is transmitted from the management server 110 to the multi-functional peripheral 120.

In S1204, the data management unit 601 writes the user setting value and the group setting value received in S1203 to the setting value DB 800 in the HDD 305. In S1205, the user authenticated in S1201 refers to and uses the latest user setting value and the group setting value written in S1204.

Figure 13:
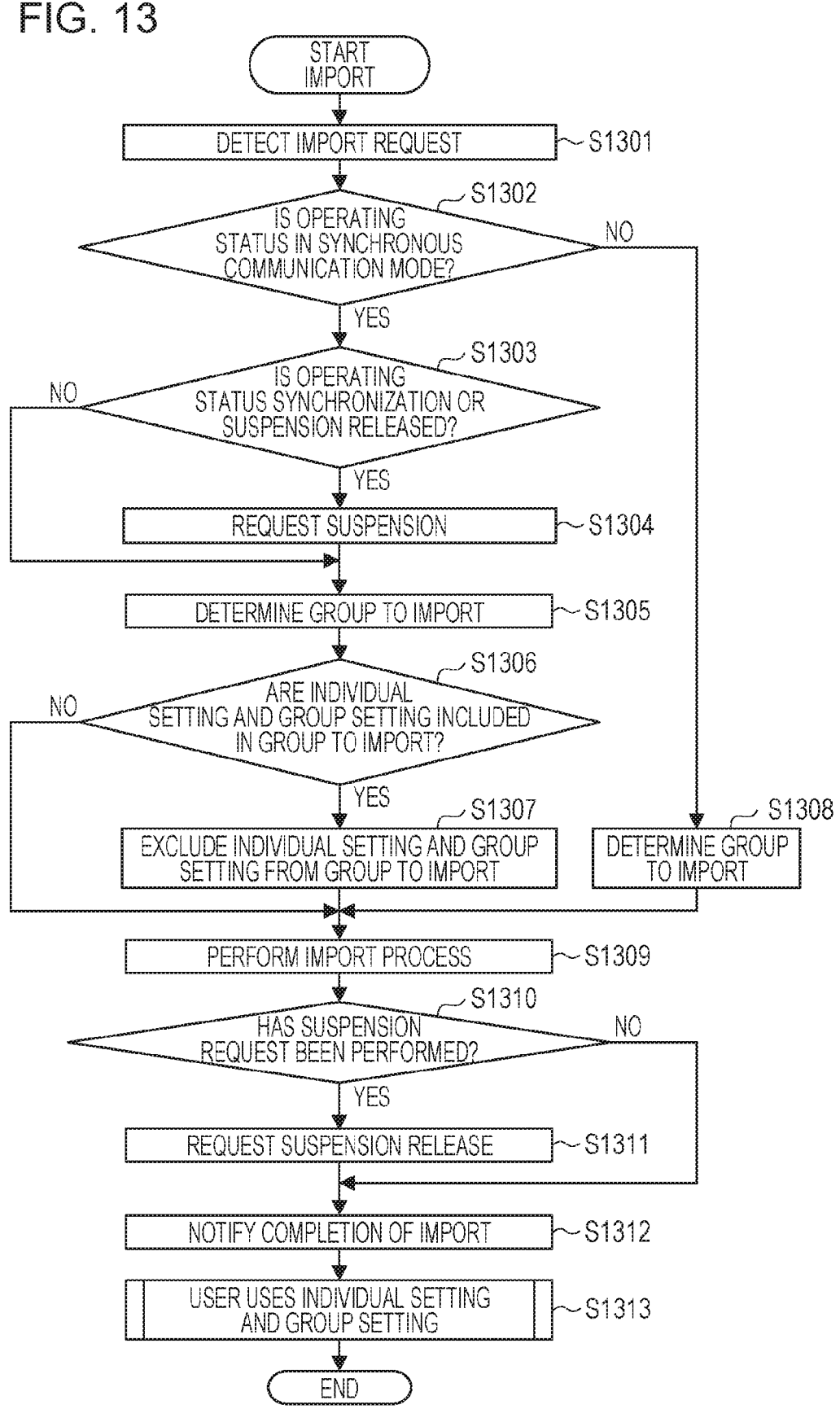
FIG. 13 is a flowchart of a method for controlling the information processing apparatus.

FIG. 13 is a flowchart illustrating a method for controlling the information processing apparatus according to the present embodiment. This example is a procedure of the import process performed by the collective distribution application 502 illustrated in FIG. 5 in accordance with the determination as to whether the management mode is to synchronize the setting information managed by the management apparatus with the device setting information managed by the information processing apparatus. The multi-functional peripheral 120 is described as an exemplary device. Each step is implemented when the CPU 302 of the multi-functional peripheral 120 executes the stored control program. Hereafter, a module executed by the CPU 302 is described mainly.

In S1301, the user interface unit 701 detects an import request accepted from a user. The detected import request is issued to the import/export request receiving unit 702. The import/export request receiving unit 702 determines that the request is an import request, and issues an import request to the import unit 703. Here, it is supposed that the import request of the import data of FIG. 9 has been issued.

In S1302, the synchronization status determination unit 707 determines whether the operation status of the synchronization process is in the synchronous communication mode. The synchronization status determination unit 707 determines by the operation status management unit 604 which refers to the license status and the operation status of the synchronization management application 501. For example, if the license is invalid, the operation status is determined to be in the asynchronous communication mode. If the license is valid, the operation status is determined to be in the synchronous communication mode. If the synchronization status determination unit 707 determines that the operation status is the synchronous communication mode, the process proceeds to S1303, and if not, the process proceeds to S1308.

In S1303, the synchronization status determination unit 707 determines whether the operation status of the synchronization process is the synchronization status or the suspension released status. If the synchronization status determination unit 707 determines that the operation status is the synchronization status or the suspension released status, the process proceeds to S1304, and if not, the process proceeds to S1305.

In S1304, the synchronization temporarily control unit 708 suspends the synchronization process. If the synchronization status determination unit 707 determines in S1303 that the operation status is the suspension released status, the status is changed in this order: suspension released status, the synchronization status, the transition to suspension status again, and the suspension status.

In S1305, the target group determination unit 706 determines the group included in the import file. In the import data of FIG. 9, it is turned out that four groups of "individual setting," "network setting," "print setting," and "group setting" are included.

In S1306, the target group excluding unit 709 determines whether "individual setting" and "group setting" are included in the group included in the import file. If the target group excluding unit 709 determines that "individual setting" and "group setting" are included in the group, the process proceeds to S1307, and if not, the process proceeds to S1309. Regarding the import data illustrated in FIG. 9, since "individual setting" and "group setting" are included in the group, the process proceeds to S1307.

In S1307, the target group excluding unit 709 excludes "individual setting" and "group setting" from the import target group. Regarding the import data of FIG. 9, "network setting" and "print setting" are stored as the import target group as a result of the process of S1307.

In S1308, the target group determination unit 706 determines a group included in the import file, and stores as import target group. Since the process itself is the same as that of S1305, regarding the import data of FIG. 9, it is turned out that four groups of "individual setting," "network setting," "print setting," and "group setting" are included.

In S1309, the import unit 703 performs the import process. Here, the import target group stored in S1307 or S1308 is considered as the import target.

In S1310, it is determined whether the synchronization temporarily control unit 708 has issued a suspension request in S1304. If it is determined that the synchronization temporarily control unit 708 has issued a suspension request, the process proceeds to S1311, and if not, the process proceeds to S1312. In S1311, the synchronization temporarily control unit 708 issues a suspension release request.

In S1312, the import unit 703 notifies the import/export request receiving unit 702 of completion of import. The import/export request receiving unit 702 notifies the user interface unit 701 of completion of import. The user interface unit 701 notifies the user of completion of import on an unillustrated UI.

In S1313, the user uses the multi-functional peripheral 120. The flow of this process corresponds to the flowchart described in FIG. 12. According to the configuration of the present embodiment, since "individual setting" and "group setting" are not imported even if the import data of FIG. 9 is imported, the user can use the latest "individual setting" and "group setting" held by the management server 110.

Setting of the multi-functional peripheral 120 except "individual setting" and "group setting" can be imported as the user intends.

Figure 14:
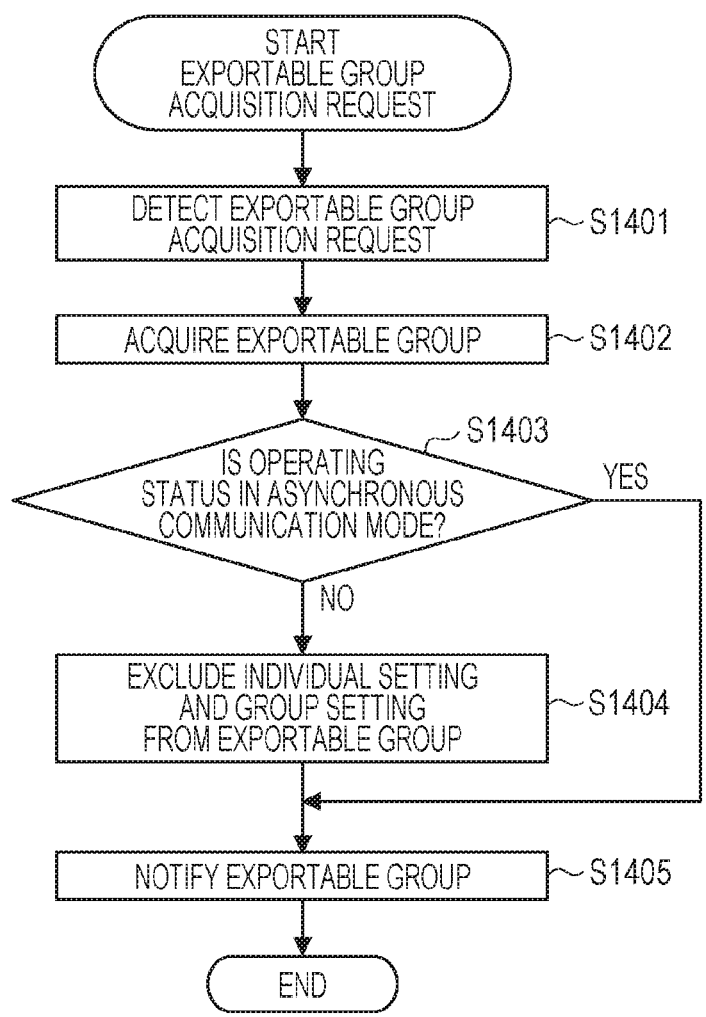
FIG. 14 is a flowchart of a method for controlling the information processing apparatus.

FIG. 14 is a flowchart illustrating a method for controlling the information processing apparatus according to the present embodiment. This example is a procedure of an exportable group acquisition request for displaying an export screen by the collective distribution application 502. The multi-functional peripheral 120 is described as an exemplary device. Each step is implemented when the CPU 302 of the multi-functional peripheral 120 executes the stored control program. Hereafter, a module executed by the CPU 302 is described mainly.

In S1401, the exportable group acquisition unit 705 detects the exportable group acquisition request from the user interface unit 701. In S1402, the exportable group acquisition unit 705 acquires a group of setting values held by the multi-functional peripheral 120. Here, it is supposed that four groups of "individual setting," "network setting," "print setting," and "group setting" are acquired.

In S1403, an operation status of the synchronization management application 501 is determined by the synchronization status determination unit 707. If it is determined that the operation status is the asynchronous communication mode, S1405 is processed. If it is determined that the operation status is any other status, S1404 is processed.

In S1404, the target group excluding unit 709 excludes "individual setting" and "group setting" from the exportable group. In the example of S1402, "network setting" and "print setting" remain as the exportable group. Further, "individual setting" and "group setting" are stored as non-export-target group.

In S1405, the exportable group acquisition unit 705 notifies the exportable group and the non-export-target group. According to the process result of S1404, an export screen as illustrated in FIG. 10B can be displayed. In this manner, the process of FIG. 14 is completed.

Figure 15:
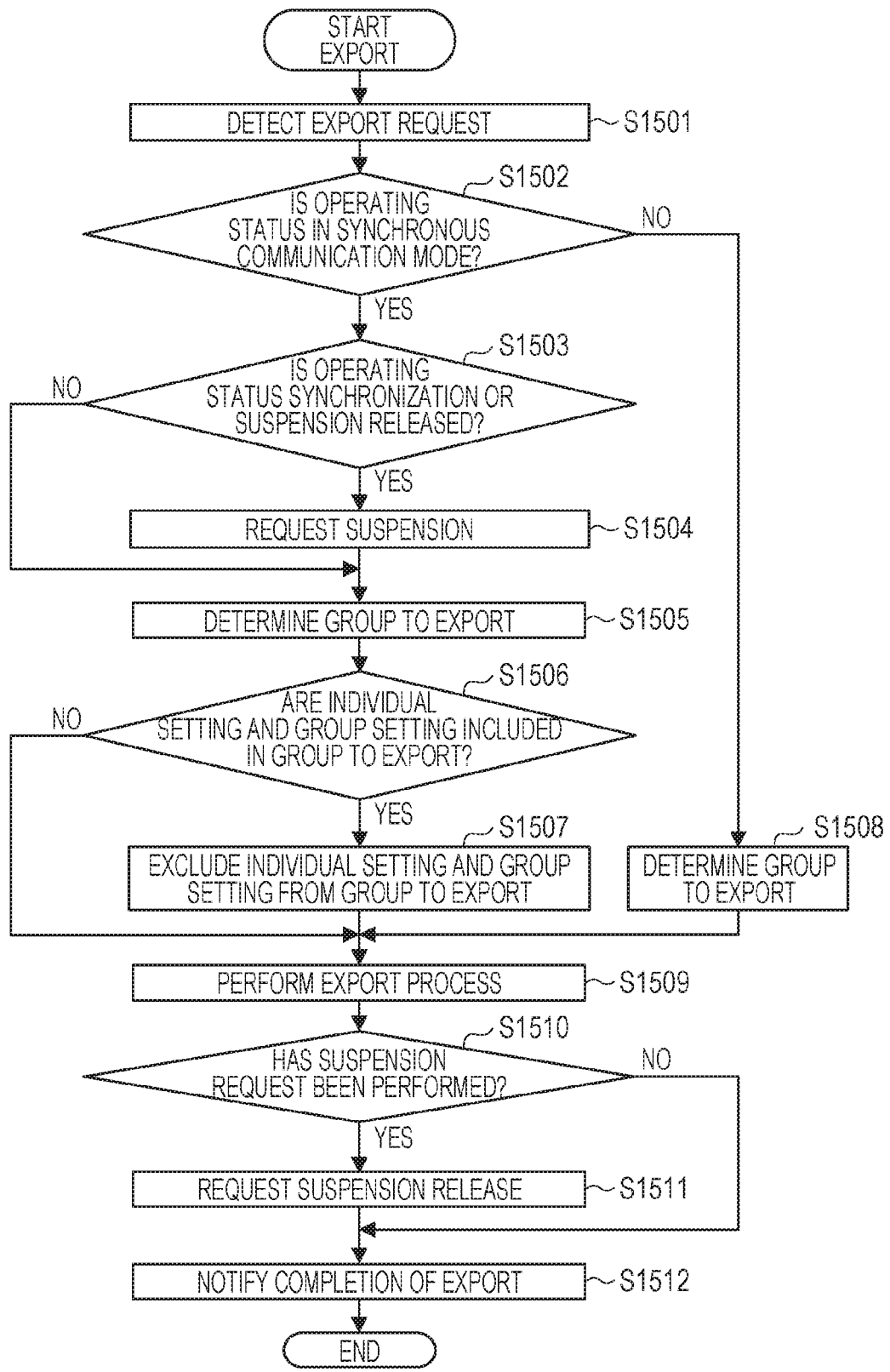
FIG. 15 is a flowchart of a method for controlling the information processing apparatus.

FIG. 15 is a flowchart illustrating a method for controlling the information processing apparatus according to the present embodiment. This example is a procedure of the export process by the collective distribution application 502. The multi-functional peripheral 120 is described as an exemplary device. Each step is implemented when the CPU 302 of the multi-functional peripheral 120 executes the stored control program. Hereafter, a module executed by the CPU 302 is described mainly.

In S1501, the user interface unit 701 detects an export request. The detected export request is issued to the import/export request receiving unit 702. The import/export request receiving unit 702 determines that it is an export request, and issues the export request to the export unit 704. Here, the multi-functional peripheral 120 holds the data shown in Table 3 of the device individual setting value DB and the data shown in the table of the user setting value DB. It is supposed that three groups of "individual setting," "print setting," and "group setting," are designated as the export targets.

In S1502, the synchronization status determination unit 707 determines whether the operation status of the synchronization process is in the synchronous communication mode. The synchronization status determination unit 707 determines by the operation status management unit 604 which refers to the license status and the operation status of the synchronization management application 501. For example, if the license is invalid, the operation status is determined to be in the asynchronous communication mode.

If the license is valid, the operation status is determined to be in the synchronous communication mode. If the synchronization status determination unit 707 determines that the operation status is the synchronous communication mode, the process proceeds to S1503, and if not, S1508 is processed.

In S1503, the synchronization status determination unit 707 determines whether the operation status of the synchronization process is the synchronization status or the suspension released status. If the synchronization status determination unit 707 determines that the operation status is the synchronization status or the suspension released status, the process proceeds to S1504, and if not, the process proceeds to S1505.

In S1504, the synchronization temporarily control unit 708 suspends the synchronization process. If it is determined in S1503 that the operation status is the suspension released status, the status is changed in this order: suspension released status, the synchronization status, the transition to suspension status again, and the suspension status.

In S1505, the target group determination unit 706 temporarily stores the export target group. In this step, the target group determination unit 706 stores the export target group received by the import/export request receiving unit 702 as it is. In the example of S1501, "individual setting," "print setting," and "group setting" are stored as they are.

In S1506, the target group excluding unit 709 determines whether "individual setting" and "group setting" are included in the export target group. Here, if it is determined that "individual setting" and "group setting" are included in the export target group, the process proceeds to S1507, and if not, the process proceeds to S1509. In the example of S1501, since "individual setting" and "group setting" are included, S1507 is processed.

In S1507, the target group excluding unit 709 excludes "individual setting" and "group setting" from the export target group. In the example of S1501, "individual setting" and "group setting" are excluded, and "print setting" is stored as the export target group.

In S1508, the target group determination unit 706 determines an export target group. In this step, the target group determination unit 706 stores the export target group received by the import/export request receiving unit 702 as it is. In the example of S1501, "individual setting," "print setting," and "group setting" are stored as they are.

In S1509, the export unit 704 performs the export process. The export target group stored in S1507 or S1508 is considered as the export target. In the example of S1507, the export target group is only "print setting." Regarding the data of Table 3 of the device individual setting value DB, "settings.pattern" and "settings.density" are the export target.

In S1510, it is determined whether the synchronization temporarily control unit 708 has issued a suspension request in S1504. Here, if the synchronization temporarily control unit 708 determines that the suspension request has been issued, S1511 is processed. If the synchronization temporarily control unit 708 determines that the suspension request has not been issued, S1512 is processed. In S1511, the synchronization temporarily control unit 708 issues a suspension release request.

In S1512, the export unit 704 notifies the import/export request receiving unit 702 of completion of export. The import/export request receiving unit 702 notifies the user interface unit 701 of completion of export, and completes this process. The user interface unit 701 notifies the user of completion of export on an unillustrated UI.

In S1513, the user uses the multi-functional peripheral 120. The flow of this process corresponds to the flowchart described in FIG. 12. According to the configuration of this patent, since "individual setting" and "group setting" are not exported, the user will not wrongly import not-the-latest-setting stored in the multi-functional peripheral 120 to another multi-functional peripheral.

As described above, according to the present embodiment, in an environment in which the setting values are managed by the management server 110, a possibility that the latest individual setting or group setting will not inadvertently be deleted during import or export of the setting value can be eliminated.

Second Embodiment

In the first embodiment, the target group excluding unit 709 excludes "individual setting" and "group setting" uniformly depending on the synchronization status. However, if the base of the user is moved due to, for example, transfer, the user no more has a means to move its own "individual setting" to a multi-functional peripheral 120 that is not managed by the management server 110. Then, in the second embodiment, a configuration in which only the "individual setting" of the user who instructs the collective distribution is included in the process target is described. In the following description, configurations different from those of the first embodiment will be described.

Figure 10C:
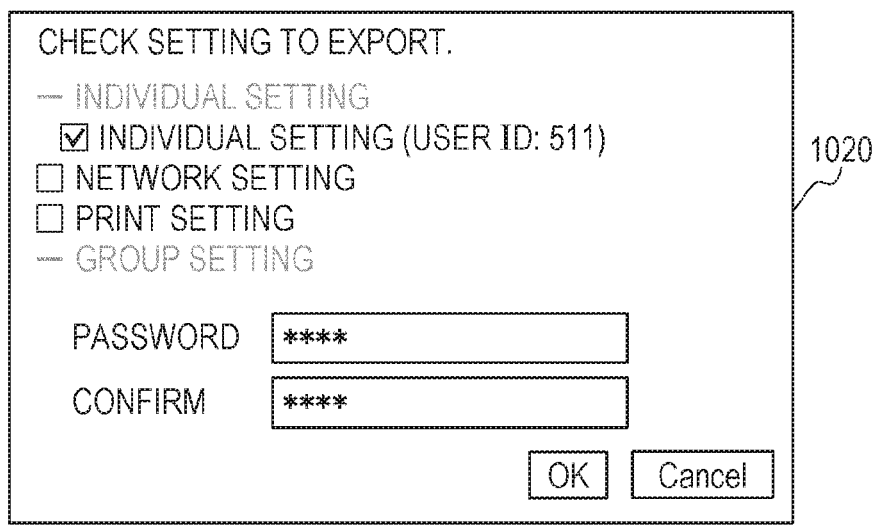

FIG. 10C is an exemplary export screen in the second embodiment. Although the individual setting cannot be selected, a note is added to "individual setting" notifying that only the setting of "user ID: 511" which is the currently operating user is the process target.

The export unit 704 is also notified from the import/export request receiving unit 702 that individual setting of the specific user is the export target. If no "individual setting" exists but only "individual setting" of the specific user exists in the export target group, the "individual setting" of an authenticated user notified from the authentication management application 503 is exported. In the status illustrated in FIG. 10C, only the "individual setting" of which user ID is 511 is the export target.

The exportable group acquisition unit 705 determines an exportable group also including the individual setting of the authenticated user notified from the authentication management application 503.

Exemplary export data exported in the status of FIG. 10C is illustrated in FIG. 11. The "individual setting" of which user ID is 511 has been exported.

The import unit 703 is also notified from the import/export request receiving unit 702 that the individual setting of the specific user is to be imported. If individual setting of the authenticated user notified from the authentication management application 503 is included in the import data, only the individual setting of the authenticated user is set as an import target regardless of the synchronization status. With the configuration described above, the user can export only its own "individual setting" and import to another device regardless of the synchronization status.

Third Embodiment

In the first embodiment, the group to be excluded by the group excluding unit 709 is fixed. Depending on the configuration of the management server 110, however, the setting groups to be synchronized may be variable. Either or both of "individual setting" and "group setting" may be synchronized or not. In the third embodiment, a configuration in which only the synchronization target setting is excluded by the target group excluding unit 709 is described. In the following description, configurations different from those of the first embodiment will be described.

The operation status management unit 604 holds information about a communication mode for each group of a target setting value. An exemplary operation status is shown in Table 10.

TABLE 10

| GROUP | OPERATION STATUS |
|---|---|
| | OPERATION STATUS |
| PRINT SETTING | ASYNCHRONOUS COMMUNICATION MODE |
| NETWORK SETTING | ASYNCHRONOUS COMMUNICATION MODE |
| INDIVIDUAL SETTING | SYNCHRONOUS COMMUNICATION MODE |
| GROUP SETTING | ASYNCHRONOUS COMMUNICATION MODE |
| . . . | |

According to the operation status shown in Table 10, it is turned out that only the individual setting information is in the synchronous communication mode. The synchronization request management unit 603 is configured to determine the operation status by groups. The synchronization status determination unit 707 acquires the operation status by groups from the operation status management unit 604.

The target group excluding unit 709 statically stores non-import-target groups: "group setting" and "individual setting." Among these, the operation status by groups determined by the synchronization status determination unit 707 is considered, and only the group which is not in the asynchronous communication mode is determined as the non-import-target group. In the example of the table of the operation status, "individual setting" is not in the asynchronous communication mode. Therefore, only "individual setting" is recognized as the non-import-target group and excluded. With the configuration described above, even if the synchronous communication mode differs for each group of the setting value, the target group of the collective distribution function can be limited appropriately.

The present invention is applicable also to a process in which a program that performs one or more functions of the above-described embodiments is supplied to a system or an apparatus via a network or a storage medium, and one or more processors in a computer of the system or the apparatus read and execute the program. Further, the present invention is implementable in a circuit having one or more functions (e.g., ASIC).

According to the above embodiments, predetermined setting information can be set to be a non-import target or a non-export target when an import instruction or an export instruction about the setting information is received from a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-113010, filed Jun. 3, 2015, and No. 2016-050873, filed Mar. 15, 2016, which are hereby incorporated by reference herein in their entirety.

What is claimed is:

1. An information processing apparatus communicating with a management apparatus, comprising:
   one or more processors;
   a storage unit configured to store setting information including a plurality of setting values; and
   a memory storing instructions that, when executed by the one or more processors, cause the information processing apparatus to perform operations comprising:
   receiving an instruction for importing setting information based on a user instruction;
   determining whether setting information held by the management apparatus and the setting information stored in the storage unit are in a synchronization state;
   changing the synchronization state to a suspension state, excluding predetermined setting information from setting information to be imported based on the user instruction, importing the setting information from which the predetermined setting information is excluded, and updating the setting information stored in the storage unit, in a case where the instruction for importing the setting information is received and the setting information held by the management apparatus and the setting information stored in the storage unit are in the synchronization state; and
   acquiring predetermined information held by the management apparatus by changing the suspension state to the synchronization state after finishing importing the setting information,
   wherein the predetermined setting information is setting information managed in the management apparatus as a setting value common to the information processing apparatus and another information processing apparatus different from the information processing apparatus.

2. The information processing apparatus according to claim 1, wherein the predetermined setting information includes at least user setting information or group setting information.

3. The information processing apparatus according to claim 1, wherein the setting information includes function setting information, network setting information, user setting information, and group setting information.

4. The information processing apparatus according to claim 3, wherein the function setting information is the setting based on a function performed by the information processing apparatus.

5. The information processing apparatus according to claim 3, wherein the function performed by the information processing apparatus includes printing, copying, transmission, and facsimile.

6. An information processing apparatus which communicates with a management apparatus, comprising:
  one or more processors;
  a storage unit configured to store setting information including a plurality of setting values;
  a memory storing instructions that, when executed by the one or more processors, cause the apparatus to perform operations comprising:
  receiving an instruction for exporting the setting information stored in the storage unit based on a user instruction;
  determining whether setting information held by the management apparatus and the setting information stored in the storage unit are in a synchronization state; and
  changing the synchronization state to a suspension state, excluding predetermined setting information from setting information to be exported based on the user instruction, and exporting the setting information from which the predetermined setting information is excluded, in a case where the instruction for exporting the setting information is received and the setting information held by the management apparatus and the setting information stored in the storage unit are in the synchronization state,
  wherein the predetermined setting information is setting information managed in the management apparatus as a setting value common to the information processing apparatus and another information processing apparatus different from the information processing apparatus.

7. The information processing apparatus according to claim 6, wherein the predetermined setting information includes at least user setting information or group setting information.

8. The information processing apparatus according to claim 6, wherein the setting information includes function setting information, network setting information, user setting information, and group setting information.

9. The information processing apparatus according to claim 8, wherein the function setting information is the setting based on a function performed by the information processing apparatus.

10. The information processing apparatus according to claim 8, wherein the function performed by the information processing apparatus includes printing, copying, transmission, and facsimile.

11. A method for controlling an information processing apparatus which communicates with a management apparatus, the information processing apparatus having a storage configured to store setting information including a plurality of setting values, the method comprising:
  receiving an instruction for importing setting information based on a user instruction;
  determining whether setting information held by the management apparatus and the setting information stored in the storage unit are in a synchronization state;
  changing the synchronization state to a suspension state, excluding predetermined setting information from setting information to be imported based on the user instruction, importing the setting information from which the predetermined setting information is excluded, and updating the setting information stored in the storage unit, in a case where the instruction for importing the setting information is received and the setting information held by the management apparatus and the setting information stored in the storage unit are in the synchronization state; and
  acquiring predetermined information held by the management apparatus by changing the suspension state to the synchronization state after finishing importing the setting information,
  wherein the predetermined setting information is setting information managed in the management apparatus as a setting value common to the information processing apparatus and another information processing apparatus different from the information processing apparatus.

12. The method for controlling the information processing apparatus according to claim 11, wherein the predetermined setting information includes at least user setting information or group setting information.

13. A method for controlling an information processing apparatus which communicates with a management apparatus, the information processing apparatus having a storage configured to store setting information including a plurality of setting values, the method comprising:
  receiving an instruction for exporting the setting information stored in the storage unit based on a user instruction;
  determining whether setting information held by the management apparatus and the setting information stored in the storage unit are in a synchronization state; and
  changing the synchronization state to a suspension state, excluding predetermined setting information from setting information to be exported based on the user instruction, and exporting the setting information from which the predetermined setting information is excluded, in a case where the instruction for exporting the setting information is received and the setting information held by the management apparatus and the setting information stored in the storage unit are in the synchronization state,
  wherein the predetermined setting information is setting information managed in the management apparatus as a setting value common to the information processing apparatus and another information processing apparatus different from the information processing apparatus.

14. The method for controlling an information processing apparatus according to claim 13, wherein the predetermined setting information includes at least user setting information or group setting information.

15. A non-transitory computer readable medium configured to store instructions that, when executed, causes an information processing apparatus to perform a process, the information processing apparatus communicating with a management apparatus and having a storage unit configured to store setting information including a plurality of setting values, the process comprising:

receiving an instruction for importing setting information based on a user instruction;

determining whether setting information held by the management apparatus and the setting information stored in the storage unit are in a synchronization state;

changing the synchronization state to a suspension state, excluding predetermined setting information from setting information to be imported based on the user instruction, importing the setting information from which the predetermined setting information is excluded, and updating the setting information stored in the storage unit, in a case where the instruction for importing the setting information is received and the setting information held by the management apparatus and the setting information stored in the storage unit are in the synchronization state;

acquiring predetermined information held by the management apparatus by changing the suspension state to the synchronization state after finishing importing the setting information.

16. A non-transitory computer readable medium configured to store instructions that, when executed, causes an information processing apparatus to perform a process, the information processing apparatus communicating with a management apparatus and having a storage configured to store setting information including a plurality of setting values, the process comprising:

receiving an instruction for exporting the setting information stored in the storage unit based on a user instruction (S1501 in FIG. 15);

determining whether setting information held by the management apparatus and the setting information stored in the storage unit are in a synchronization state (S1503 in FIG. 15);

changing the synchronization state to a suspension state, excluding predetermined setting information from setting information to be exported based on the user instruction, and exporting the setting information from which the predetermined setting information is excluded, in a case where the instruction for exporting the setting information is received and the setting information held by the management apparatus and the setting information stored in the storage unit are in the synchronization state;

wherein the predetermined setting information is setting information managed in the management apparatus as a setting value common to the information processing apparatus and another information processing apparatus different from the information processing apparatus, wherein the management apparatus.

* * * * *